(12) United States Patent
Benjamin

(10) Patent No.: US 8,352,901 B2
(45) Date of Patent: Jan. 8, 2013

(54) TECHNIQUE FOR GENERATION OF LOAD-SLEW INDICES FOR CIRCUIT CHARACTERIZATION

(75) Inventor: Ben Varkey Benjamin, Kochi (IN)

(73) Assignee: Wipro Limited, Bangalore, Karnataka (IN)

( * ) Notice: Subject to any disclaimer, the term of this patent is extended or adjusted under 35 U.S.C. 154(b) by 1432 days.

(21) Appl. No.: 11/951,337

(22) Filed: Dec. 6, 2007

(65) Prior Publication Data

US 2009/0150835 A1 Jun. 11, 2009

(51) Int. Cl.
*G06F 17/50* (2006.01)

(52) U.S. Cl. .................................................. 716/138

(58) Field of Classification Search ............... 716/136
See application file for complete search history.

(56) References Cited

U.S. PATENT DOCUMENTS

| | | | |
|---|---|---|---|
| 7,072,812 B2 * | 7/2006 | Corr | 703/2 |
| 7,369,974 B2 * | 5/2008 | Yang et al. | 703/2 |
| 7,444,275 B2 * | 10/2008 | Carelli, Jr. | 703/14 |
| 7,644,378 B2 * | 1/2010 | Wang et al. | 716/132 |
| 7,925,998 B2 * | 4/2011 | Ishibashi et al. | 716/101 |

OTHER PUBLICATIONS

Bhardwaj et al., "A framework for statistical timing analysis using non-linear delay and slew models", Proceedings of the 2006 IEEE/ACM international conference on Computer-aided design, Nov. 5-9, 2006, pp. 225-230.*

* cited by examiner

*Primary Examiner* — Jack Chiang
*Assistant Examiner* — Brandon Bowers
(74) *Attorney, Agent, or Firm* — Prakash Nama; Global IP Services, PLLC

(57) ABSTRACT

A method and system for generation of low-slew indices for circuit characterization are disclosed. In one embodiment, a method for automatically generating a subset of sampling points from a set of load and slew points for circuit characterization includes iteratively obtaining sampling points such that error between an actual value and an interpolated intermediate value is below or equal to a threshold error value. The subset of sampling points is then formed from the iteratively obtained sampling points.

17 Claims, 8 Drawing Sheets

200

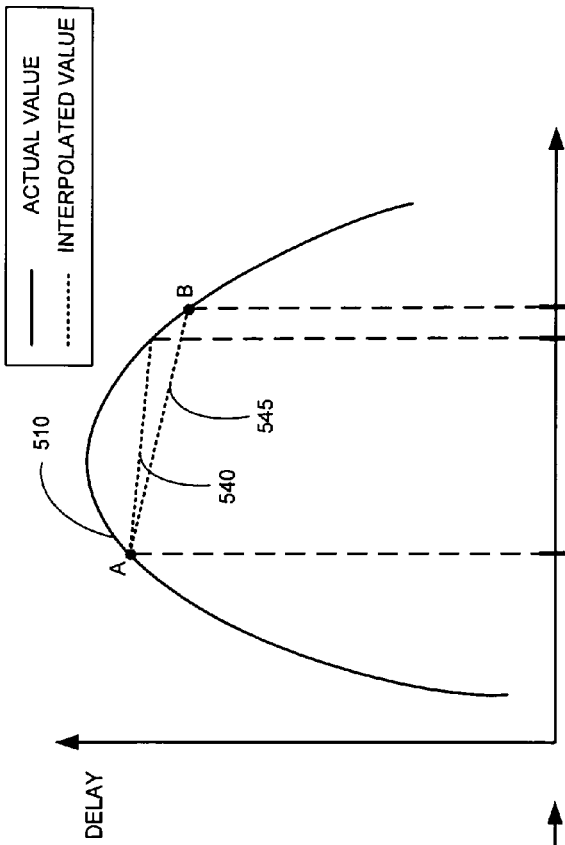
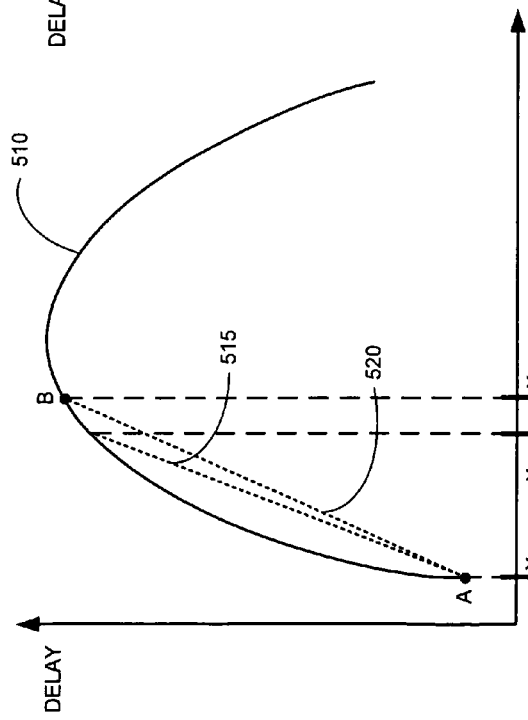
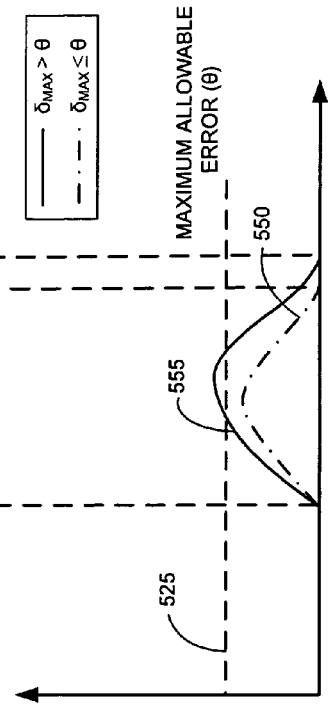
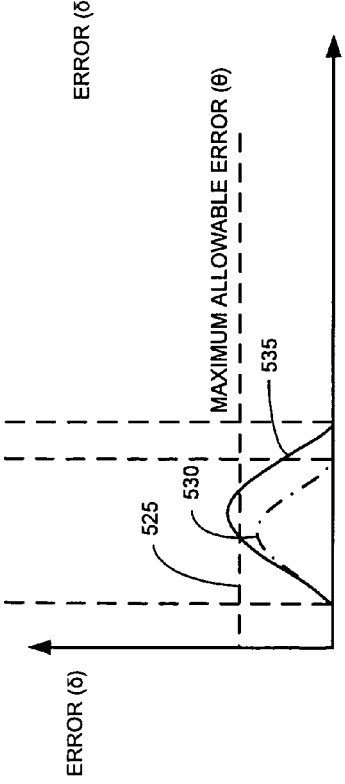
FIG. 5A
FIG. 5B
FIG. 5C
FIG. 5D

TECHNIQUE FOR GENERATION OF LOAD-SLEW INDICES FOR CIRCUIT CHARACTERIZATION

FIELD OF THE INVENTION

The present invention relates generally to digital circuits and more particularly relates to a technique for generation of load-slew indices for circuit characterization.

BACKGROUND

Circuit characterization is a process of capturing circuit performance and representing the same as a black box model. SPICE simulations are performed for various input slew and output load combinations for the timing/power arcs identified from functionality and results are typically captured as a Liberty model. This Liberty model provides information on circuit performance such as delays, transition time, power, and input capacitance.

Computer-Aided-Design (CAD) systems comprise a combination of hardware and software that enable an engineer to simulate the performance of electronic systems and circuits before implementing the design in a more permanent manner. One such area that uses CAD systems frequently is the design of Application Specific Integrated Circuits (ASICs). ASICs are typically designed by using CAD system to assemble building blocks into a circuit design. Once assembled, performance characteristics of the circuit design are calculated based upon the known performance characteristics of each building block. Since the building blocks, often referred to as cells, have known performance characteristics that are typically stored in a standard cell library, the CAD system can retrieve specific data from the standard cell library to calculate parameters of the circuit design performance.

The standard cell library may contain data about several different cells. A typical standard cell library will have performance characteristics, that depends upon the magnitude of the load connected to the cell. The load is typically measured in capacitance or in proportion to capacitance. Finally, with respect to delay, the standard cell library may provide information for a logic-0 to logic-1 transition and a logic-1 to logic 0 transition.

In addition to the data described above with respect to the standard cell library, manufacturers will also typically provide data about the delay time of a cell based upon varying input slew rates. The slew rate is the rate of change of signal with respect to time. Since cells are often connected in series, the output signal of one cell is often the input signal to the next cell. Thus, the delay time of a cell will varies depending upon the slew rate of the input signal.

However, a problem with data accuracy arises because of size and data limitations of a standard cell library. Storing performance characteristics for every possible load would require a prohibitive amount of data storage space. Thus, by convention, only a few load-slew values, typically 5-8 per set of conditions, are stored for any particular cell in the standard cell library. The chosen representative load and slew values are called characterization points and are typically provided by component manufacturers. When a CAD system calls for a load-slew value that is not one of the characterization points stored in the standard cell library, one approach requires an approximation to be made between the four closest characterization points.

Current Electronic Design Automation (EDA) tools use various models for capturing circuit performance, such as delay associated with a load-slew. One conventional method uses popular model NLDM (Non-Linear Delay Model) to capture, the circuit characteristics like timing and power in the form of 2D or 3D look up tables with the input slew and output load used as the indices. The accuracy of the load-slew delay surface (or load-slew-power surface) captured in the method depends to a considerable extent on the choice of load-slew points. Determination of load-slew indices using this method requires pre-calculated data for representative cells, typically obtained by SPICE simulations. This method requires more number of points for higher accuracy.

This conventional method takes the most logical path of iteratively calculating the error between the curve and the interpolated value. The polyline is split based on the calculated error. This method obtains a reduced set of sampling points by iteratively identifying those samples whose interpolated values have a deviation greater than a specified tolerance. In this method during successive iterations, the sample with maximum deviation is added to the set of reduced samples. However, this method may not yield the minimum number of sampling points.

Consider a curve with vertex having positive ordinate as shown in FIG. 2A that illustrates a delay Vs slew for a load using a solid line. The dotted line in FIG. 2A shows the interpolated value. FIG. 2B at the bottom shows the error between the actual value and the interpolated value. FIGS. 2A and 2B illustrate result of first iteration and FIGS. 3A and 3B illustrate the result of second iteration.

It can be seen in FIGS. 2A, 2B, 3A, and 3B that, before the first iteration, only the extreme points in the abscissa ($X_{min}$ and $x_{max}$) are available in the set of final sampling points. In the first iteration (FIGS. 2A and 2B), the sampling point x1 is added to the final set of sampling points because the interpolated value can have the maximum deviation at this point. In the next iteration, shown in FIGS. 3A and 3B, points on either sides of the peak (X2 and x3) are added to the final set because the deviation is greater then the acceptable tolerance. The drawback of this method is that points are chosen with peak deviations and may not yield a minimum number of sampling points. One other drawback with this technique is that this method also fails to accommodate a three dimensional surface.

BRIEF DESCRIPTION OF THE DRAWINGS

Example embodiments are illustrated by way of example and not limitation in the figures of the accompanying drawings, in which like references indicate similar elements and in which:

FIGS. 4A and 4B are graphs that illustrate the result of the second iteration.

FIGS. 5A, 5B, 5C, and 5D are graphs that illustrate calculating the error between the actual value on the curve and interpolated value, according to one embodiment of the present invention.

Other features of the present embodiments will be apparent from the accompanying drawings and from the detailed description that follows.

DETAILED DESCRIPTION

A method and system for generation of low-slew indices for circuit characterization are disclosed. In the following description, for purposes of explanation, numerous specific details are set forth in order to provide a thorough understanding of the various embodiments. It will be evident, however, to one skilled in the art that the various embodiments may be practiced without these specific details.

The terms "sampling points" and "load and/or slew points" are used interchangeably throughout the document. The terms "actual value" and "interpolated intermediate value" refers to actual delay, power, rise and fall times, and the like.

Figure 1:
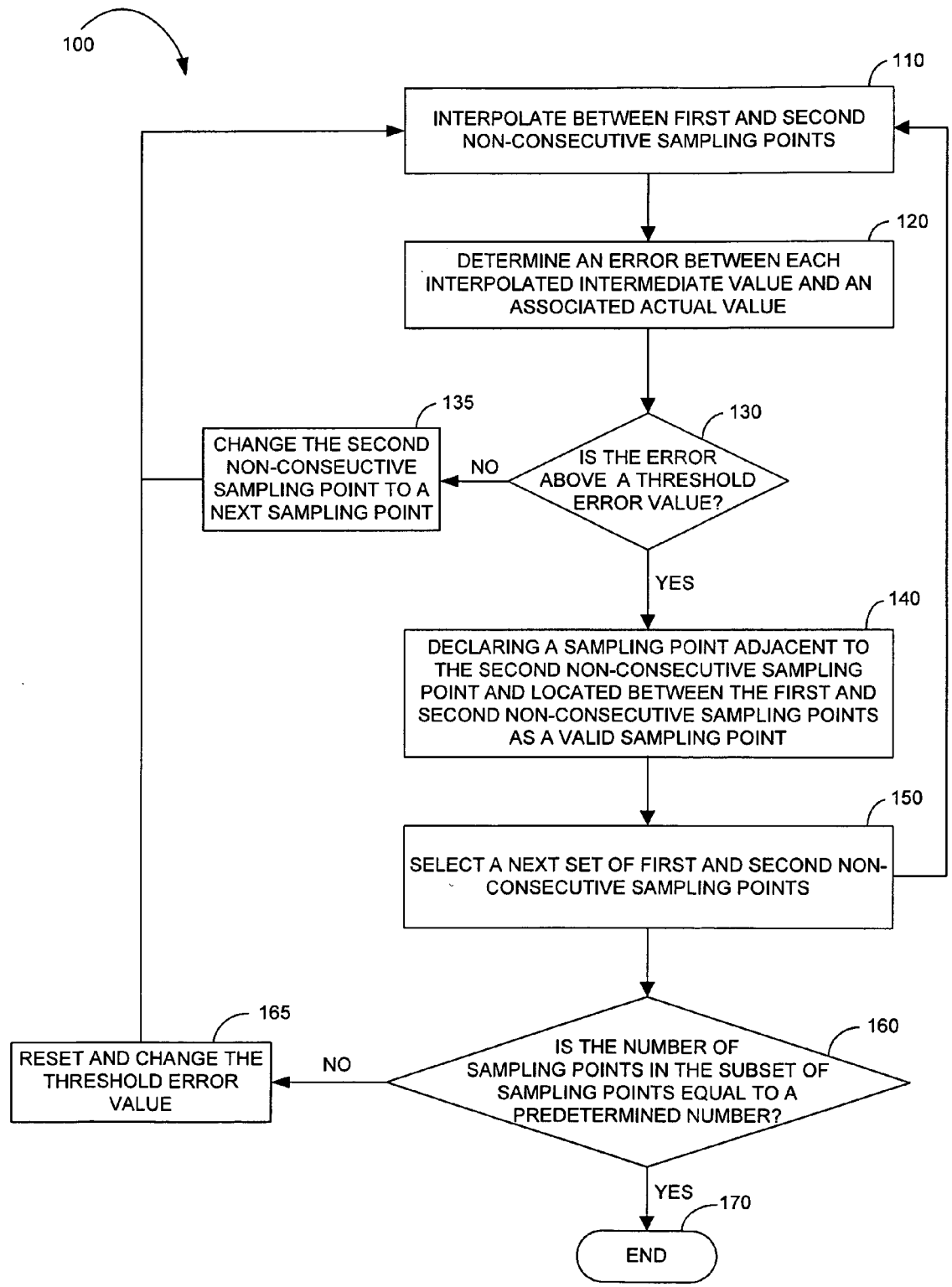
FIG. 1 is a process flow illustrating automatically generating a subset of sampling points from a set of load and slew points for circuit characterization, according to one embodiment.

FIG. 1 is a process flow 100 illustrating automatically generating a subset of sampling points from a set of load and slew points for circuit characterization, according to one embodiment. In operation 110, interpolated intermediate values are computed by interpolating between first and second non-consecutive sampling points. In operation 120, an error ($\delta_{max}$) between each interpolated intermediate value and an associated actual value is determined. The error $\delta_{max}$ is the maximum of the errors obtained for each of the interpolated intermediate value and an associated actual value. In operation 130, the process flow 100 determines whether the error ($\delta_{max}$) is above a threshold error value ($\theta$) by comparing the error with the threshold error value ($\theta$).

In operation 135, the second non-consecutive sampling point is changed to a next sampling point, if the error ($\delta_{max}$) is below or equal to the threshold error value ($\theta$). The process flow 100 is then routed to operation 110 and repeats the operations 110-130 (i.e., interpolating, determining and comparing). In these embodiments, the steps of interpolating, determining and comparing are repeated using a third non-consecutive sampling point with respect to the first point and is next to the second non-consecutive sampling point.

The process flow 100 goes to operation 140, if the error ($\delta_{max}$) is above the threshold error value ($\theta$). In operation 140, a sampling point substantially adjacent to the second non-consecutive sampling point and located between the first and second non-consecutive sampling points is declared as a valid sampling point based on the outcome of the comparison.

In operation 150, a next set of first and second non-consecutive sampling points are selected to compute the interpolated intermediate values. In these embodiments, the next set of first and second non-consecutive sampling points starts at the declared valid sampling point. Further, the steps of interpolating, determining and comparing are repeated using the next set of first and second non-consecutive sampling points.

In operation 160, a check is made to determine whether number of sampling points in the subset of sampling points is equal to a predetermined number. If the number of sampling points in the subset of sampling points is equal to the predetermined number, the process flow 100 goes to operation 170 and ends the automatically generating a subset of sampling points from a set of load and slew points for circuit characterization. If the number of sampling points in the subset of sampling points is not equal to the predetermined number, the threshold error value ($\theta$) is being reset and changed in operation 165. The process 100 is then routed to operation 110 and repeats the operations 110-150 (i.e., interpolating, determining, comparing, declaring, selecting and comparing).

In one embodiment, the operations 110-160 (i.e., interpolating, determining and comparing) are repeated to iteratively obtain the sampling points such that error ($\delta_{max}$) is below or equal to a threshold error value ($\theta$). Further, the subset of sampling points is generated from the iteratively obtained sampling points. In these embodiments, the subset of sampling points is automatically generated from the set of load and slew points for circuit characterization.

In one embodiment, obtaining the set of load and slew points such that error ($\delta_{max}$) between an actual value and an interpolated intermediate value is below or equal to a threshold error value ($\theta$) includes interpolating between first and second non-consecutive slew points to compute the interpolated intermediate values for each of the load points, determining an error ($\delta_{max}$) between each interpolated intermediate value and the actual value, and comparing the error ($\delta_{max}$) with the threshold error value ($\theta$) and declaring a slew point adjacent to the second non-consecutive slew point and located between the first and second non-consecutive slew points as a valid slew point based on the outcome of the comparison. In some embodiments, the interpolated intermediate value is selected from the group consisting of computed interpolated intermediate values associated with delay value, power value, and rise and fall times.

In another embodiment, obtaining the set of load and slew points such that error ($\delta_{max}$) between an actual value and an interpolated intermediate value is below or equal to a threshold error value ($\theta$) includes interpolating between first and second non-consecutive load points to compute the interpolated intermediate values for each of the slew points, determining an error ($\delta_{max}$) between each interpolated intermediate value and the actual value, and comparing the error ($\delta_{max}$) with the threshold error value ($\theta$) and declaring a load point adjacent to the second non-consecutive load point and located between the first and second non-consecutive load points as a valid load point based on the outcome of the comparison. In some embodiments, the interpolated intermediate value is selected from the group consisting of computed interpolated intermediate values associated with delay value, power value, and rise and fall times.

Figure 2A:
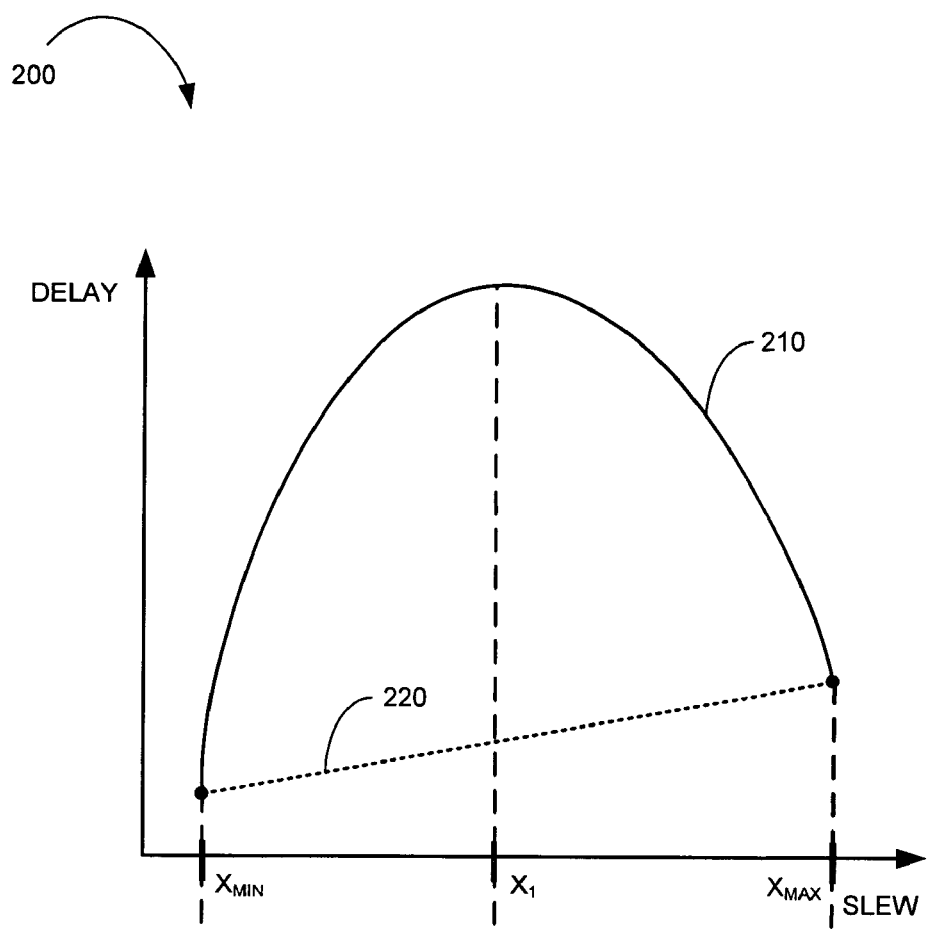
FIGS. 2A and 2B are graphs that illustrate a first iteration of calculating the error between the actual value on the curve and interpolated value (i.e., delay Vs slew for a particular load and the error between the actual value and the interpolated value, respectively.
Figure 2B:
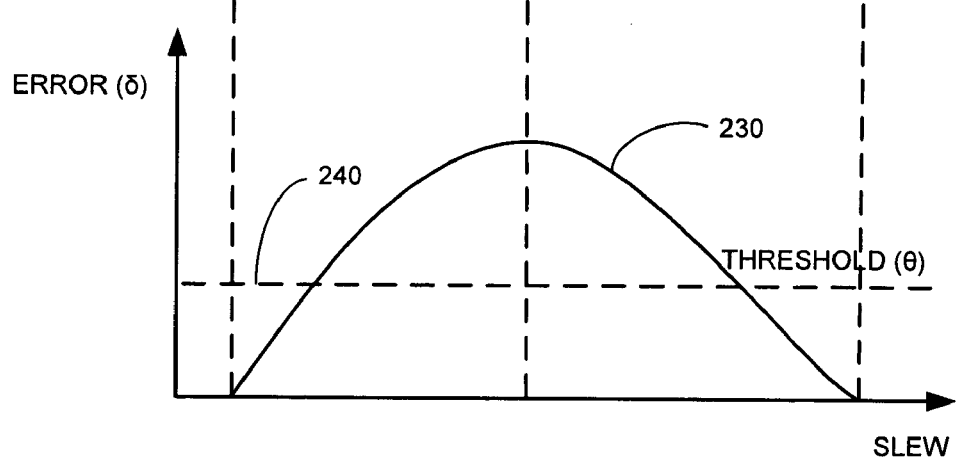

FIGS. 2A and 2B are graphs that illustrate a first iteration of calculating an error ($\delta_{max}$) between actual value on a curve and interpolated value. Consider a curve with vertex having positive ordinate as shown in FIG. 2A. Parabolic curve illustrated in FIG. 2A represents delay Vs slew for a particular load and dotted line represents the interpolated value. FIG. 2B represents the error ($\delta$) between the actual value and the interpolated value, respectively. Before the first iteration, a set of first sampling points consists of extreme points in the abscissa—$x_{min}$ and $x_{max}$. In the first iteration illustrated in the FIG. 2A, the sampling point $x_1$ is added to the final set of sampling points as the interpolated value has the maximum deviation at this point.

Figure 3A:
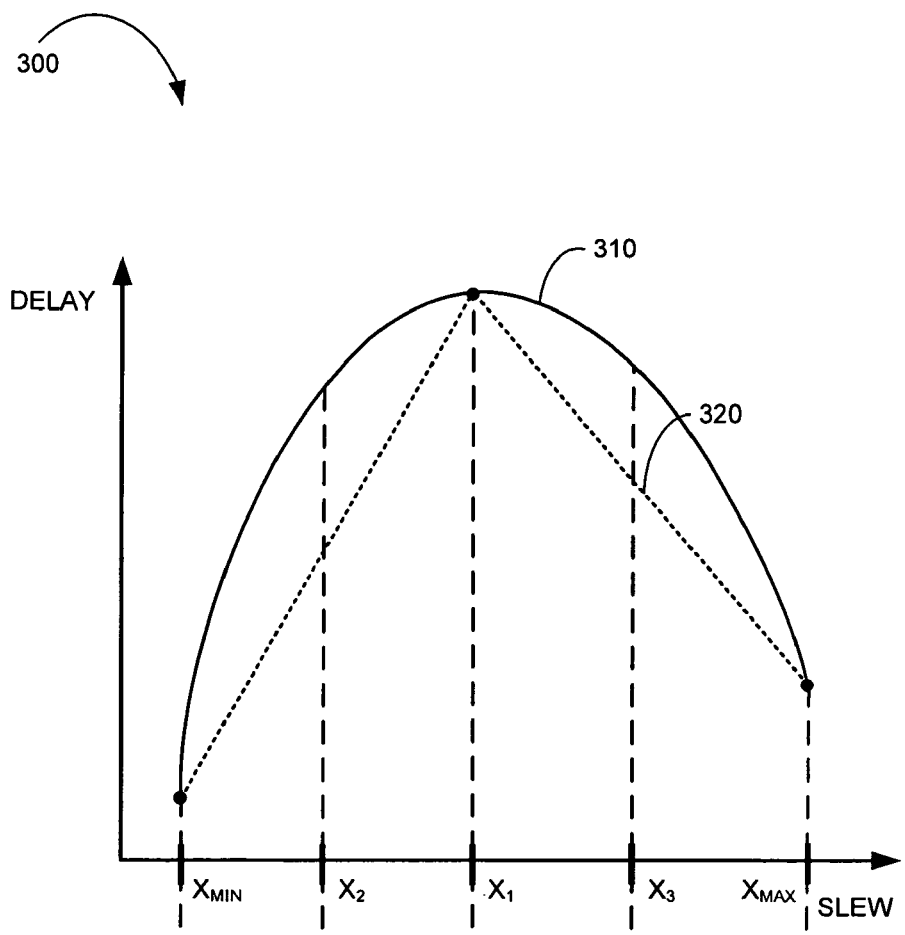
FIGS. 3A and 3B are graphs that illustrate a second iteration calculating the error between the actual value on the curve and interpolated value.
Figure 3B:
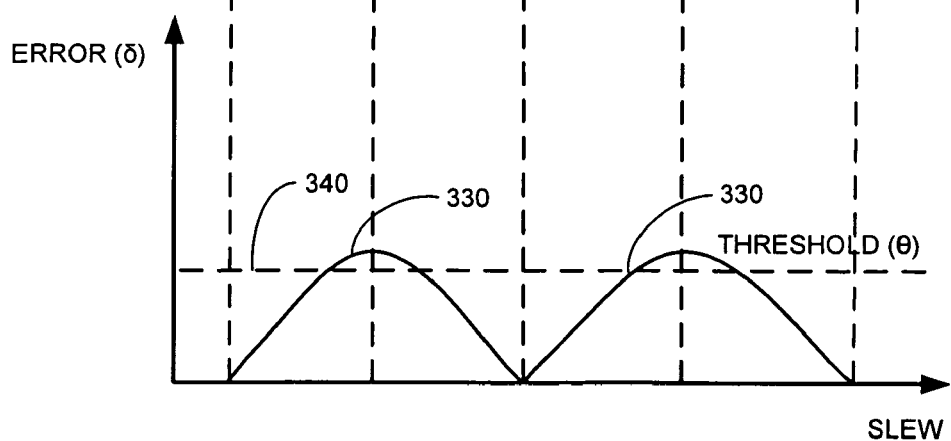

FIGS. 3A and 3B are graphs that illustrate a second iteration calculating the error ($\delta$) between the actual value on the curve and interpolated value. In FIG. 3A, the curve is interpolated with 3 sampling points (i.e., $x_{min}$, $x_1$ and $x_{max}$). With this, 2 error peaks with respect to slew x (e.g., as illustrated in FIG. 3B) are obtained when interpolated with 3 sampling points (i.e., $x_{min}$, $x_1$ and $x_{max}$).

Thus in the second iteration illustrated in the FIG. 2A, the sampling points $x_2$ and $X_3$ on the either side of $x_1$ are added to the final set of sampling points as the interpolated value has the maximum deviation at these points. Further, it can be seen from FIG. 3B that the interpolated value have the deviation greater than the acceptable tolerance ($\theta$).

Figure 4B:
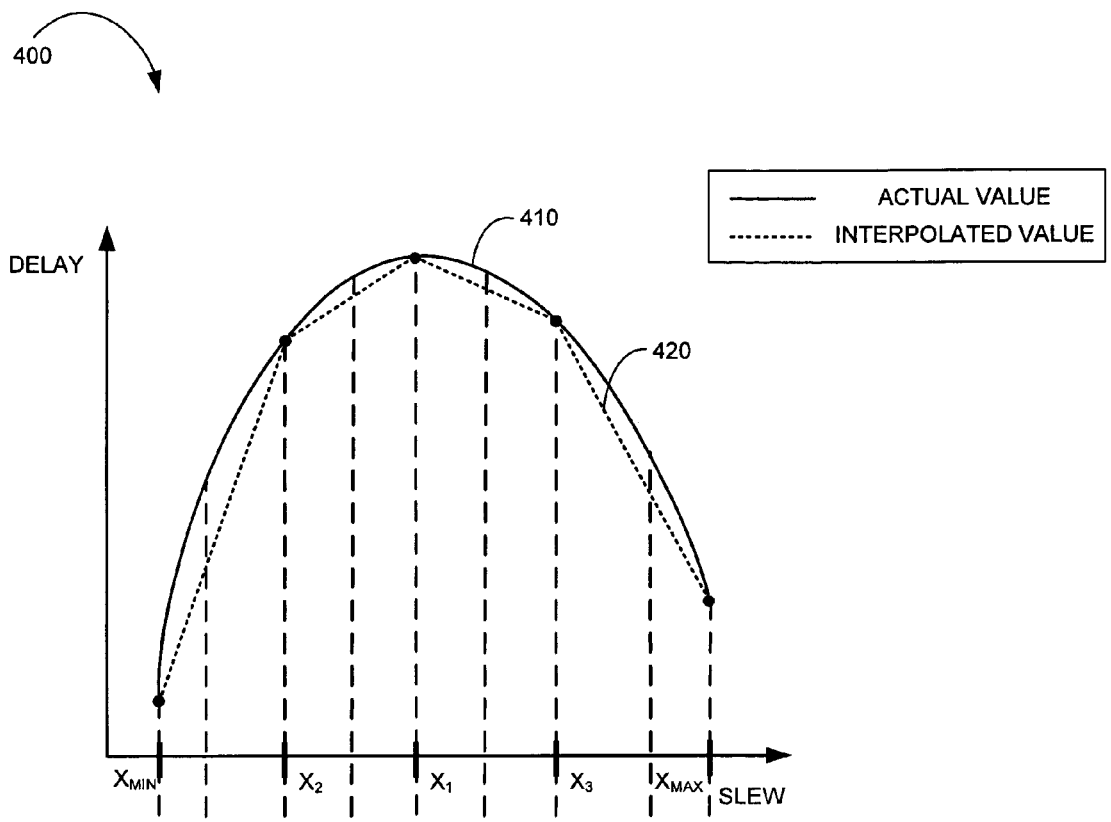

FIGS. 4A and 4B are graphs that illustrate the result of the second iteration. In FIG. 4A, the curve is interpolated with 5 sampling points (i.e., $x_{min}$, $x_2$, $x_1$ and $x_{max}$). With this, 4 error peaks with respect to slew x (e.g., as illustrated in FIG. 4B) are obtained when interpolated with 5 sampling points (i.e., $x_{min}$, $x_2$, $x_1$, $x_3$ and $x_{max}$).

Thus it can be seen from FIG. 4B that the interpolated value after second iteration have maximum deviation lesser than the acceptable tolerance $\theta$.

Figure 4B:
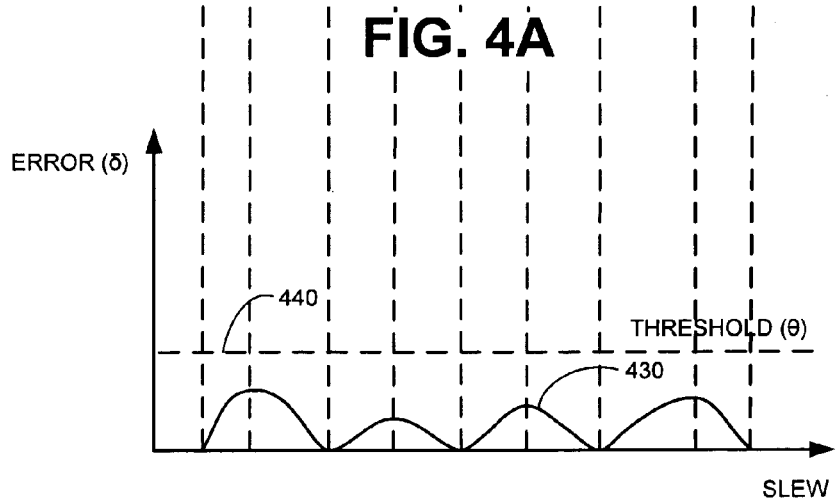

The above-described method takes the most logical path of iteratively calculating the error between the curve and the interpolated value. The method for polyline approximation illustrated in FIGS. 2, 3 and 4 is based on identification of sampling points with peak error on interpolation. In this method, the polyline (i.e., the parabolic curve) is split based on the calculated error.

In the above-described method, reduced set of sampling points are obtained by iteratively identifying those samples whose interpolated values have a deviation greater than a specified tolerance $\theta$. Further in this method, it can be noted that during successive iterations (e.g., illustrated in FIGS. 2, 3 and 4), the set with maximum deviation is added to the set of reduced samples. Hence, the sample with the maximum deviation fails to give minimum error when interpolated with minimum number of sampling points. Further, it can be realized from the above-described technique that better set can be obtained by selecting those points with less than peak deviations in lieu of those selected with peak deviations. The following description provides an efficient solution to overcome the limitations of the above-described method along with other features of the present invention.

FIGS. 5A, 5B, 5C, and 5D are graphs that illustrate calculating the error ($\delta_{max}$) between the actual value on the curve and interpolated value, according to one embodiment of the present invention. Particularly, FIG. 5A illustrates a first sampling point A and a second non-consecutive sampling point B having abscissa of A and B correspond to $x_\alpha$ and $x_\beta$ respectively. Since the maximum error ($\delta_{max}$) 535 is greater than maximum allowable tolerance ($\theta$) (e.g., as illustrated in FIG. 5B), compute interpolated intermediate values through interpolating between the first sampling point A and the second non-consecutive sampling point B.

The error ($\delta_{max}$) is compared with the threshold error value ($\theta$) and a sampling point (Y) substantially adjacent to the second non-consecutive sampling point (B) and located between the first sampling points (A) and second non-consecutive sampling point (B) is declared as a valid sampling point based on the outcome of the comparison.

As illustrated in FIG. 5A, the abscissa corresponds to Y is $x_{(\beta-1)}$. Therefore, the error 530 (e.g., as illustrated in FIG. 5B) between the actual value (A) and the interpolated intermediate value (Y) is less than the maximum allowable tolerance ($\theta$).

As illustrated above, the error ($\delta_{max}$) 535 between A and B is greater than maximum allowable error ($\theta$), i.e., $\delta_{max} > \theta$, a new value is assigned to $\alpha$ (i.e., $\alpha = \beta - 1$). Thus A is updated to reflect the new value of $\alpha = \beta - 1$ and the process of interpolating, determining and comparing is repeated for the next set of first sampling point and second non-consecutive sampling point where the next set of sampling points starts at the declared valid sampling point $x_{(\beta-1)}$, as illustrated in FIGS. 5C and 5D. The above-described process can be better explained using the following algorithm named $\Lambda$.

The following assumptions are made for implementing the algorithm $\Lambda$:

The complete set of sampling points is represented as the set SS. This set has N elements. Each element in this set is represented by $x_i$, with $1 \leq i \leq N$.

The complete set of sampled values is represented as the set SV. This set has the same number of elements as SS. Each element in this set is represented by $y_j$, with $1 \leq j \leq N$ The reduced set of sampling points is represented as the set SR. This set has M elements. It can be understood that SR is subset of SS.

The error tolerance between actual value and interpolated value is $\theta$.

The error may be square error or square relative error.

The algorithm $\Lambda$ is implemented as follows:

1. Initialize the set SR to null (i.e. SR=Ø). Let point A=($x_1$, $y_1$).
2. Add abscissa of A to SR. For example, if A=($x_1$, $y_1$), then SR=SR ∪{$x_1$}.
3. Select the second point from A and mark it as B. For example, if A is marked as ($x_1$, $y_1$) then select ($x_3$, $y_3$) as B.
4. Let the abscissa of A corresponds to $x_\alpha$ in SS and abscissa of B corresponds to $x_\beta$ in SS.
5. For each of the elements $x_i$ in SS between A and B, find the value y from the equation $$y=(y_3-y_1)/(x_3-x_1) \cdot x+((y_1 \cdot (x_3-x_1))-(x_1 \cdot (y_3-y_1)))/(x_3-x_1)$$

The calculated value y is a function of A, B and $x_i$ and is denoted as y(A, B, $x_i$) with $\alpha < i < \beta$.

6. For each of the values of y thus calculated, find the maximum error $\delta_{max}$ with respect to corresponding element in SV i.e., $\delta_{max}$=f($y_i$, y(A, B, $x_i$)).
7. If ($\delta_{max} \leq \theta$), then $\beta=(\beta+1)$. If ($\beta > N$) then go to step 9, else steps 4 to 6 are repeated.
8. If ($\delta_{max} > \theta$) then $\alpha=(\beta-1)$. A is updated to reflect the new value of $\alpha$. If ($\alpha < N-1$) then repeat steps 2 to 6, else SR=SR ∪{$x_\alpha$} and go to step 9.
9. SR=SR ∪{$x_N$}.

Figure 6:
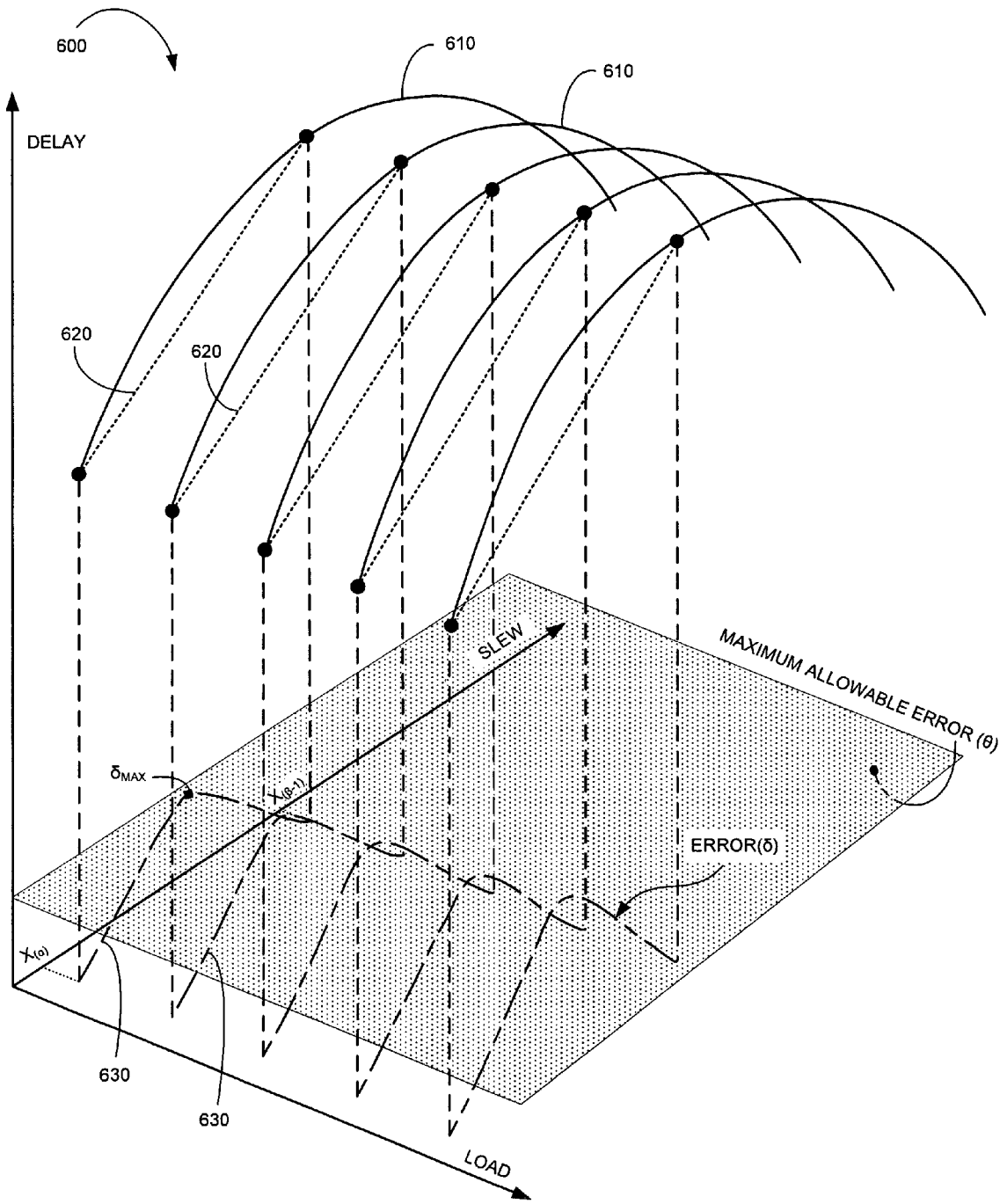
FIG. 6 is a three dimensional graph illustrating computation of the error between the actual value on the curve and interpolated value for different input slew and output load conditions, according to an embodiment of the present invention.

FIG. 6 is a three dimensional graph 600 illustrating computation of the error ($\delta$) 630 between the actual value on the curve and interpolated value for different input slew and output load conditions, according to an embodiment of the present invention.

Algorithm $\Psi$ (an extension of algorithm $\Lambda$ to accommodate three dimensional sample surface) is illustrated in FIG. 6. In some embodiments, the algorithm $\Lambda$ can be extended to the algorithm $\Psi$ based on the fact that the surface can be represented by series of curves 610. The algorithm $\Psi$ accommodates two independent variables viz. input slew and output load and one dependent variable delay, for example, delay Based on the following observations, the algorithm $\Lambda$ can be extended to accommodate three dimensional surfaces:

The surface is a function of discrete values of independent variables (i.e., input slew and output load).

The surface can be represented by two dimensional curves with projections having orthogonal orientations.

The surface can be analyzed by selecting two dimensional curves for an independent variable and a dependent variable for different values of the other independent variable.

In some embodiments, maximum deviation $\delta'_{max}$ is calculated from error $\delta$ 630 for each curve 610 with one independent variable held constant. In the example embodiment illustrated in FIG. 6, load is held constant. From FIG. 6, it can be seen that the maximum deviation $\delta'_{max}$ is less than the maximum allowable error $\theta$ (i.e., $\delta'_{max}<\theta$). Therefore, the algorithm $\Psi$ is taken through the next iteration as illustrated in FIG. 7.

Figure 7:
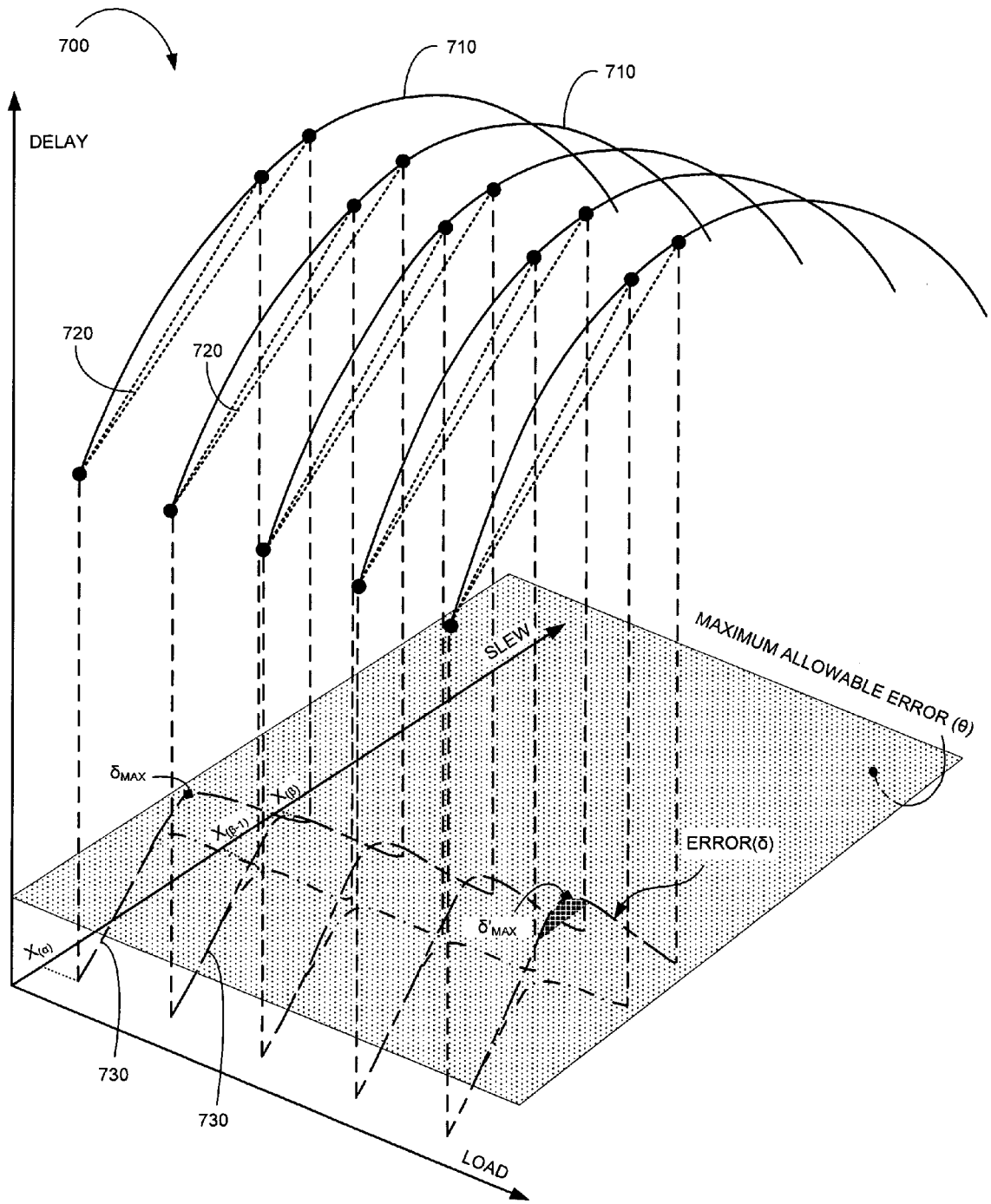
FIG. 7 is a three dimensional graph illustrating a next iteration for computation of the error between the actual value on the curve and interpolated value for different input slew and output load conditions, according to an embodiment of the present invention.

FIG. 7 is a three dimensional graph 700 illustrating a next iteration for computation of the error $\delta$ 730 between the actual value on the curve and the interpolated value for the different input slew and output load conditions, according to an embodiment of the present invention. Referring to FIG. 7 and in continuance with FIG. 6, in the next iteration, the curve for maximum load gives maximum error $\delta_{max}$ greater than maximum allowable error ($\theta$). Consequently, $\delta'_{max}$ is greater than the maximum allowable error ($\theta$). Hence, sampling point $x_{(\beta-1)}$ is added to the reduced set of sampling points. FIG. 6 and FIG. 7 are better illustrated using the following algorithm.

The following assumptions are made by modifying the algorithm $\Lambda$ for extending the algorithm to accommodate three dimensional surfaces:

The second independent variable is z and the set of sampling points for z form the set ST. This set has N' elements. Each element in this set is represented by $z_i$, with $1\leq i \leq N'$.

The reduced set of sampling points for independent variable z is the set SU. This set has M' elements. It is understood that SU $\subset$ ST.

Further, the algorithm $\Lambda$ is modified to get the algorithm $\Psi$ as follows:
1. Initialize set SR to null i.e. SR=∅. Point A=$(z_1, y_1)$
2. For each $z_i$ of ST, steps 2 to 6 in the algorithm $\Lambda$ are performed with the following considerations:
    SV is different for each value of $z_i$. Consequently, at the end of step 6, there will be N' values for $\delta_{max}$ (i.e., $\delta_{max1}, \delta_{max2}, \ldots \delta_{maxN'}$).
    Find $\delta'_{max}$ such that $\delta'_{max}$ is the maximum of the $\delta_{max}$ obtained in the previous step.
    Use this $\delta'_{max}$ instead of $\delta_{max}$ in the steps following step 6 in the algorithm $\Lambda$.
3. In step 7, if ($\beta\leq N$), then steps 4 to 6 in the algorithm $\Lambda$ are repeated for each $Z_i$ of ST.
4. In step 8, if ($\alpha<N-1$) then steps 2 to 6 in algorithm $\Lambda$ are repeated for each $Z_i$ of ST.
5. After step 9 in the algorithm $\Lambda$, steps 1 to 4 in the modified algorithm $\Psi$ are repeated with ST and SS interchanged and SU used in place of SR. SV is modified to reflect these changes i.e. the curves represented by SV will now have projections orthogonal to the one previously used.
6. At the end, the two sets SR and SU will have respectively the reduced sampling points for independent variables x and z.

Figure 8:
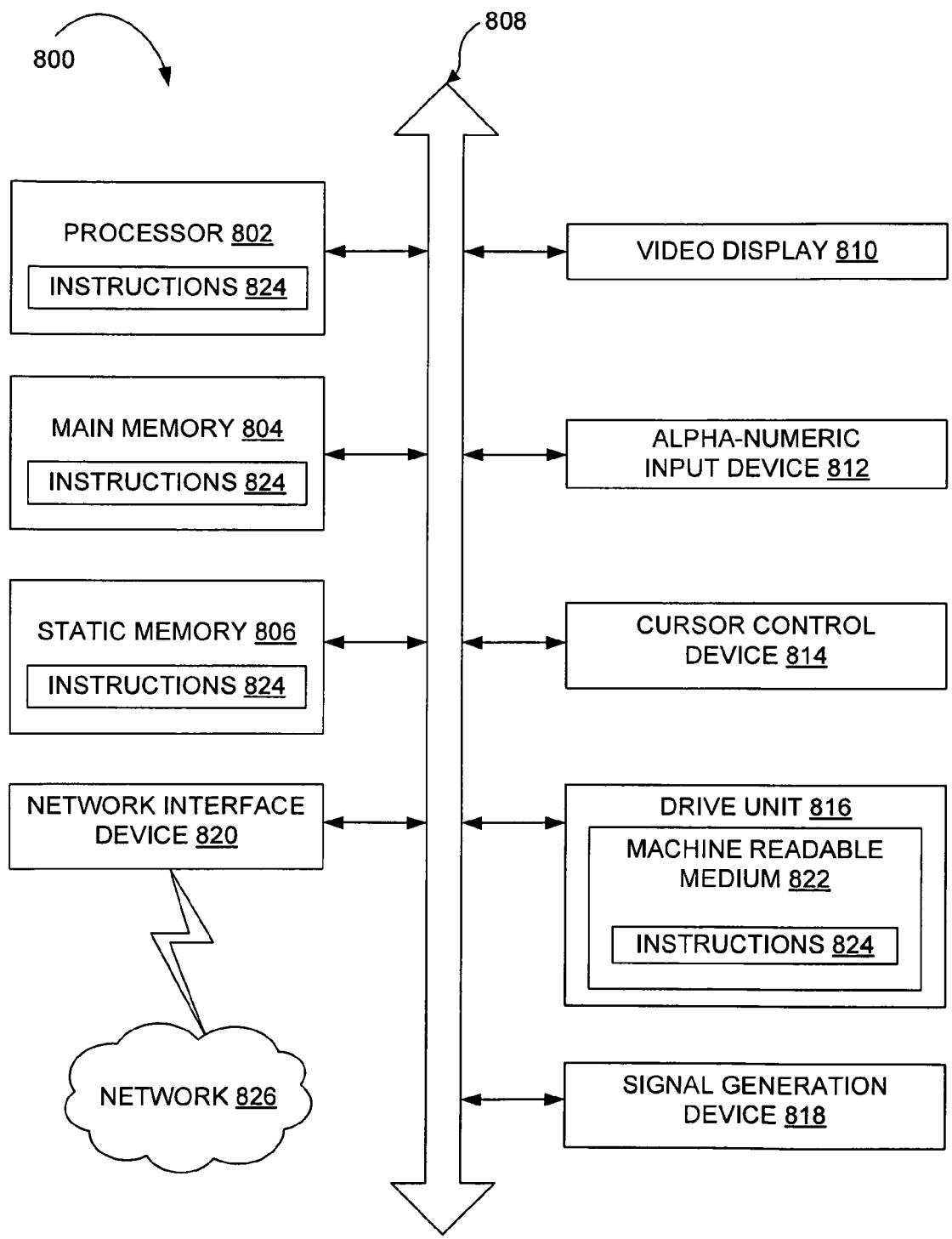
FIG. 8 is a diagrammatic system view of a data processing system in which any of the embodiments disclosed herein may be performed, according to one embodiment.

FIG. 8 is a diagrammatic system view 800 of a data processing system in which any of the embodiments disclosed herein may be performed, according to one embodiment. Particularly, the diagrammatic system view of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The diagrammatic system view 800 may indicate a personal computer and/or a data processing system in which one or more operations disclosed herein are performed. The processor 802 may be a microprocessor, a state machine, an application specific integrated circuit, a field programmable gate array, etc. The main memory 804 may be a dynamic random access memory and/or a primary memory of a computer system. The static memory 806 may be a hard drive, a flash drive, and/or other memory information associated with the data processing system.

The bus 808 may be an interconnection between various circuits and/or structures of the data processing system. The video display 810 may provide graphical representation of information on the data processing system. The alpha-numeric input device 812 may be a keypad, keyboard and/or any other input device of text (e.g., a special device to aid the physically handicapped). The cursor control device 814 may be a pointing device such as a mouse. The drive unit 816 may be a hard drive, a storage system, and/or other longer term storage subsystem.

The signal generation device 818 may be a bios and/or a functional operating system of the data processing system. The network interface device 820 may perform interface functions (e.g., code conversion, protocol conversion, and/or buffering) required for communications to and from the network 826 between a number of independent devices (e.g., of varying protocols). The machine readable medium 822 may provide instructions on which any of the methods disclosed herein may be performed. The instructions 824 may provide source code and/or data code to the processor 802 to enable any one/or more operations disclosed herein.

For example, a storage medium having instructions, that when executed by a computing platform executes a method for automatically generating a subset of sampling points from a set of load and slew points for circuit characterization, includes iteratively obtaining sampling points such that error between an actual value and an interpolated intermediate value is below or equal to a threshold error value, and generating the subset of sampling points from the iteratively obtained sampling points.

In these embodiments, iteratively obtaining the set of sampling points such that error between an actual value and an interpolated intermediate value is below or equal to a threshold error value includes interpolating between first and second non-consecutive sampling points to compute the interpolated intermediate values, determining an error between each interpolated intermediate value and the actual value, and comparing the error with the threshold error value and declaring a sampling point substantially adjacent to the second non-consecutive sampling point and located between the first and second non-consecutive sampling points, as a valid sampling point based on the outcome of the comparison.

In these embodiments, comparing the error with the threshold error value and declaring a sampling point substantially adjacent to the second non-consecutive sampling point and located between the first and second non-consecutive sampling points, as a valid point based on the outcome of the comparison includes if the error is lower or equal to the threshold error value, then repeating the steps of interpolating, determining and comparing using a third non-consecutive point with respect to the first point and is next to the second non-consecutive sampling point, and if the error is higher than the threshold error value, then declaring a sampling point adjacent to the second non-consecutive sampling point and located between the first and second non-consecutive sampling points as a valid sampling point.

In addition, the storage medium may have instructions to select a next set of first and second non-consecutive sampling points to compute the interpolated intermediate values such that the next set of first and second non-consecutive sampling points starts at the declared valid sampling point upon declaring the valid sampling point, and repeat the steps of interpolating, determining and comparing using the selected next set of first and second non-consecutive sampling points.

The storage medium may have instructions to determine whether number of sampling points in the subset of sampling points is equal to a predetermined number, if the number of sampling points in the subset of sampling points is equal to a predetermined number, stop the automatically generating the subset of sampling points from the set of load and slew points, else change the error threshold value and repeat the steps of interpolating, determining and comparing.

A computer system includes a processor, and a memory coupled to the processor, the memory having stored therein code for determining valid arcs in a digital circuit, the code causes the processor to iteratively obtain sampling points such that error between an actual value and an interpolated intermediate value is below or equal to a threshold error value, and generate the subset of sampling points from the iteratively obtained sampling points.

For example, iteratively obtaining the set of sampling points such that error between an actual value and an interpolated intermediate value is below or equal to a threshold error value includes interpolating between first and second non-consecutive sampling points to compute the interpolated intermediate values, determining an error between each interpolated intermediate value and the actual value, and comparing the error with the threshold error value and declaring a sampling point substantially adjacent to the second non-consecutive sampling point and located between the first and second non-consecutive sampling points, as a valid sampling point based on the outcome of the comparison.

In addition, comparing the error with the threshold error value and declaring a sampling point substantially adjacent to the second non-consecutive sampling point and located between the first and second non-consecutive sampling points as a valid point based on the outcome of the comparison, includes repeating the steps of interpolating, determining and comparing using a third non-consecutive point with respect to the first point and is next to the second non-consecutive sampling point if the error is lower or equal to the threshold error value, and if the error is higher than the threshold error value, then declaring a sampling point adjacent to the second non-consecutive sampling point and located between the first and second non-consecutive sampling points as a valid sampling point.

The code may cause processor to select a next set of first and second non-consecutive sampling points to compute the interpolated intermediate values such that the next set of first and second non-consecutive sampling points starts at the declared valid sampling point upon declaring the valid sampling point, and repeat the steps of interpolating, determining and comparing using the selected next set of first and second non-consecutive sampling points.

The code causes the processor to determine whether number of sampling points in the subset of sampling points is equal to a predetermined number, if the number of sampling points in the subset of sampling points is equal to a predetermined number, stop the automatically generating the subset of sampling points from the set of load and slew points, else change the error threshold value and repeat the steps of interpolating, determining and comparing.

The above-described technique may be used to obtain a minimal set of input slew and output load indices for creating lookup tables for capturing circuit performance. The above-described algorithm (e.g., algorithms $\Lambda$ and $\Psi$) can identify a set of minimum number of input slew and output load indices from a larger sample space to approximate the load-slew-delay surface. The above-described algorithm (e.g., algorithms $\Lambda$ and $\Psi$) selects points not based on the peak error but based on errors of intermediate values. Further, the above-described algorithm can be effective for finding sampling points for 2D and 3D data.

Also, the above-described method may be in a form of a machine-readable medium embodying a set of instructions that, when executed by a machine, causes the machine to perform any method disclosed herein. It will be appreciated that the various embodiments discussed herein may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method for automatically generating a subset of sampling points from a set of load and slew points for circuit characterization, comprising:
    iteratively obtaining sampling points, by a processor, such that error between an actual value and an interpolated intermediate value is below or equal to a threshold error value, wherein iteratively obtaining the sampling points such that error between an actual value and an interpolated intermediate value is below or equal to a threshold error value comprises:
        interpolating between first and second non-consecutive sampling points to compute the interpolated intermediate values;
        determining an error between each interpolated intermediate value and the actual value; and
        comparing the error with the threshold error value and declaring a sampling point substantially adjacent to the second non-consecutive sampling point and located between the first and second non-consecutive sampling points, as a valid sampling point based on the outcome of the comparison; and
    generating the subset of sampling points from the iteratively obtained sampling points by the processor.

2. The method of claim 1, wherein comparing the error with the threshold error value and declaring a sampling point substantially adjacent to the second non-consecutive sampling point and located between the first and second non-consecutive sampling points, as a valid point based on the outcome of the comparison, comprises:
    if the error is lower or equal to the threshold error value, then repeating the steps of interpolating, determining and comparing using a third non-consecutive sampling point with respect to the first point and is next to the second non-consecutive sampling point; and
    if the error is higher than the threshold error value, then declaring a sampling point adjacent to the second non-consecutive sampling point and located between the first and second non-consecutive sampling points, as a valid sampling point.

3. The method of claim 2, further comprising:
selecting a next set of first and second non-consecutive sampling points to compute the interpolated intermediate values such that the next set of first and second non-consecutive sampling points starts at the declared valid sampling point upon declaring the valid sampling point; and
repeating the steps of interpolating, determining and comparing using the selected next set of first and second non-consecutive sampling points.

4. The method of claim 2, further comprising:
determining whether number of sampling points in the subset of sampling points is equal to a predetermined number;
if the number of sampling points in the subset of sampling points is equal to a predetermined number, stopping the automatically generating the subset of sampling points from the set of load and slew points, else, changing the error threshold value and repeating the steps of interpolating, determining and comparing.

5. A method for obtaining a set of load and slew points such that error between an actual value and an interpolated intermediate value is below or equal to a threshold error value, comprising:
interpolating between first and second non-consecutive slew points to compute the interpolated intermediate values for each of the load points by a processor;
determining an error between each interpolated intermediate value and the actual value by the processor; and
comparing the error with the threshold error value and declaring a slew point adjacent to the second non-consecutive slew point and located between the first and second non-consecutive slew points, as a valid slew point based on the outcome of the comparison by the processor.

6. The method of claim 5, wherein the interpolated intermediate value is selected from the group consisting of computed interpolated intermediate values associated with delay value, power value, and rise and fall times.

7. A method for obtaining a set of load and slew points such that error between an actual value and an interpolated intermediate value is below or equal to a threshold error value, comprising:
interpolating between first and second non-consecutive load points to compute the interpolated intermediate values for each of the slew points by a processor;
determining an error between each interpolated intermediate value and the actual value by the processor; and
comparing the error with the threshold error value and declaring a load point adjacent to the second non-consecutive load point and located between the first and second non-consecutive load points as a valid load point based on the outcome of the comparison by the processor.

8. The method of claim 7, wherein the interpolated intermediate value is selected from the group consisting of computed interpolated intermediate values associated with delay value, power value, and rise and fall times.

9. The method of claim 7, wherein the interpolated intermediate value is selected from the group consisting of delay value, power value, and rise and fall times.

10. An article, comprising:
a storage medium having instructions, that when executed by a computing platform, result in execution of a method for automatically generating a subset of sampling points from a set of load and slew points for circuit characterization, comprising:
iteratively obtaining sampling points such that error between an actual value and an interpolated intermediate value is below or equal to a threshold error value, wherein iteratively obtaining the sampling points such that error between an actual value and an interpolated intermediate value is below or equal to a threshold error value comprises:
interpolating between first and second non-consecutive sampling points to compute the interpolated intermediate values;
determining an error between each interpolated intermediate value and the actual value; and
comparing the error with the threshold error value and declaring a sampling point substantially adjacent to the second non-consecutive sampling point and located between the first and second non-consecutive sampling points, as a valid sampling point based on the outcome of the comparison; and
generating the subset of sampling points from the iteratively obtained sampling points.

11. The article of claim 10, wherein comparing the error with the threshold error value and declaring a sampling point substantially adjacent to the second non-consecutive sampling point and located between the first and second non-consecutive sampling points, as a valid point based on the outcome of the comparison, comprises:
if the error is lower or equal to the threshold error value, then repeating the steps of interpolating, determining and comparing using a third non-consecutive sampling point with respect to the first point and is next to the second non-consecutive sampling point; and
if the error is higher than the threshold error value, then declaring a sampling point adjacent to the second non-consecutive sampling point and located between the first and second non-consecutive sampling points as a valid sampling point.

12. The article of claim 11, further comprising:
selecting a next set of first and second non-consecutive sampling points to compute the interpolated intermediate values such that the next set of first and second non-consecutive sampling points starts at the declared valid sampling point upon declaring the valid sampling point; and
repeating the steps of interpolating, determining and comparing using the selected next set of first and second non-consecutive sampling points.

13. The article of claim 11, further comprising:
determining whether number of sampling points in the subset of sampling points is equal to a predetermined number;
if the number of sampling points in the subset of sampling points is equal to a predetermined number, stopping the automatically generating the subset of sampling points from the set of load and slew points, else, changing the error threshold value and repeating the steps of interpolating, determining and comparing.

14. A computer system, comprising:
a processor; and
a memory coupled to the processor, the memory having stored therein code for determining valid arcs in a digital circuit, the code causes the processor to perform a method for automatically generating a subset of sampling points from a set of load and slew points for circuit characterization, comprising:

iteratively obtaining sampling points such that error between an actual value and an interpolated intermediate value is below or equal to a threshold error value, wherein iteratively obtaining the sampling points such that error between an actual value and an interpolated intermediate value is below or equal to a threshold error value comprises:
  interpolating between first and second non-consecutive sampling points to compute the interpolated intermediate values;
  determining an error between each interpolated intermediate value and the actual value; and
  comparing the error with the threshold error value and declaring a sampling point substantially adjacent to the second non-consecutive sampling point and located between the first and second non-consecutive sampling points, as a valid sampling point based on the outcome of the comparison; and
generating the subset of sampling points from the iteratively obtained sampling points.

15. The system of claim 14, wherein comparing the error with the threshold error value and declaring a sampling point substantially adjacent to the second non-consecutive sampling point and located between the first and second non-consecutive sampling points, as a valid point based on the outcome of the comparison, comprising:
  if the error is lower or equal to the threshold error value, then repeating the steps of interpolating, determining and comparing using a third non-consecutive sampling point with respect to the first point and is next to the second non-consecutive sampling point; and
  if the error is higher than the threshold error value, then declaring a sampling point adjacent to the second non-consecutive sampling point and located between the first and second non-consecutive sampling points, as a valid sampling point.

16. The system of claim 15, further comprising:
selecting a next set of first and second non-consecutive sampling points to compute the interpolated intermediate values such that the next set of first and second non-consecutive sampling points starts at the declared valid sampling point upon declaring the valid sampling point; and
repeating the steps of interpolation, determining and comparing using the selected next set of first and second non-consecutive sampling points.

17. The system of claim 15, further comprising:
determining whether the number of sampling points in the subset of sampling points is equal to a predetermined number;
if the number of sampling points in the subset of sampling points is equal to a predetermined number, stopping the automatically generating the subset of sampling points from the set of load and slew points, else, changing the error threshold value and repeating the steps of interpolating, determining and comparing.

* * * * *